US012626609B2

(12) United States Patent
　Taniguchi

(10) Patent No.: US 12,626,609 B2
(45) Date of Patent: May 12, 2026

(54) INFORMATION PROCESSING APPARATUS, INFORMATION PROCESSING METHOD, AND COMPUTER READABLE MEDIUM

(71) Applicant: Mitsubishi Electric Corporation, Tokyo (JP)

(72) Inventor: Takaya Taniguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/596,002

(22) Filed: Mar. 5, 2024

(65) Prior Publication Data

US 2024/0203278 A1　　Jun. 20, 2024

Related U.S. Application Data

(63) Continuation of application No. PCT/JP2021/039343, filed on Oct. 25, 2021.

(51) Int. Cl.
　G09B 5/02　　　　(2006.01)
(52) U.S. Cl.
　CPC ...................................... G09B 5/02 (2013.01)
(58) Field of Classification Search
　CPC ....................................................... G09B 5/02
　See application file for complete search history.

(56) References Cited

U.S. PATENT DOCUMENTS

| 10,109,258 | B2 | 10/2018 | Nishimura et al. |
| 2018/0091667 | A1 | 3/2018 | Yamasaki et al. |
| 2019/0317596 | A1 | 10/2019 | Sato |

FOREIGN PATENT DOCUMENTS

| CN | 103746895 A | 4/2014 |
| JP | 8-328715 A | 12/1996 |
| JP | 2011-107915 A | 6/2011 |
| | (Continued) | |

OTHER PUBLICATIONS

International Search Report (PCT/ISA/210) issued in PCT/JP2021/039343, dated Dec. 21, 2021.

(Continued)

*Primary Examiner* — Kesha Frisby
(74) *Attorney, Agent, or Firm* — Birch, Stewart, Kolasch & Birch, LLP

(57) ABSTRACT

An information processing apparatus (10) includes a work target detection unit (20), a confusion factor estimation unit (30), and a presentation information control unit (40). The work target detection unit (20) detects an attention device group composed of at least one device that a user who is working is paying attention to. The confusion factor estimation unit (30) sets each device, excluding a work target device, that is included in the attention device group as a target attention device, where the work target device is a device corresponding to work that the user is required to perform, and calculates a relationship score that indicates a relationship between the target attention device and the work target device, and indicates a degree of confusion of the user in choosing between the target attention device and the work target device. The presentation information control unit (40) refers to a presentation information database that records presentation information, which is information to be presented to the user to help the user to become aware of the work target device, so as to acquire presentation information based on the calculated relationship score.

9 Claims, 20 Drawing Sheets

(56)     References Cited

FOREIGN PATENT DOCUMENTS

| | | | |
|---|---|---|---|
| JP | 2011-232270 | A | 11/2011 |
| JP | 2015-184698 | A | 10/2015 |
| JP | 2017-167978 | A | 9/2017 |
| JP | 2018-49528 | A | 3/2018 |
| JP | 2018-55320 | A | 4/2018 |
| JP | 2018-180090 | A | 11/2018 |
| JP | 2019-32728 | A | 2/2019 |
| JP | 2019-185525 | A | 10/2019 |
| JP | 2019-204012 | A | 11/2019 |
| JP | 2020-144233 | A | 9/2020 |
| WO | WO 2020/194447 | A1 | 10/2020 |

OTHER PUBLICATIONS

Indian Office Action and Search Report for Indian Application No. 202447029174, dated Jul. 8, 2025, with English translation.

Fig. 2

| STEP ID | STEP NAME | CONTENT | WORK TARGET DEVICE ID | WORK ID |
|---------|-----------|---------|-----------------------|---------|
| STEP001-0001 | BOLT A REMOVAL | USE A WRENCH TO REMOVE BOLT A. | P0001 | WORK001 |
| STEP001-0002 | COVER B REMOVAL | REMOVE COVER B VERTICALLY. | P0008 | WORK001 |
| STEP001-0003 | PLUNGER C STROKE CHECK | TURN ON THE POWER, AND CHECK THE OPERATING RANGE OF PLUNGER C. | P0005 | WORK001 |
| STEP001-0004 | PLUNGER C EXTRACTION | REMOVE PLUNGER C FROM THE MAIN BODY. | P0005 | WORK001 |
| STEP001-0005 | PLUNGER C INSPECTION | CHECK THAT THERE ARE NO SCRATCHES ON THE SURFACE OF PLUNGER C. | P0005 | WORK001 |
| .. | .. | .. | .. | .. |

| DEVICE ID | DEVICE TYPE | MODEL NAME | INSTALLATION COORDINATES |
|---|---|---|---|
| P0001 | BOLT | XXX-001-MXX | (x1, y1, z1) |
| P0002 | BOLT | XXX-001-MXX | (x2, y2, z2) |
| P0003 | BOLT | YYY-002-MYY | (x3, y3, z3) |
| P0004 | SWITCH | ABC-ABC-002 | (x4, y4, z4) |
| P0005 | PLUNGER | AAA-003 | (x5, y5, z5) |
| .. | .. | .. | .. |

| PRESENTATION INFORMATION ID | DEVICE ID | TYPE OF PRESENTATION INFORMATION | PRESENTATION INFORMATION FILE NAME |
|---|---|---|---|
| DISP000-0001-001 | P0001 | 3D MODEL | P0001-001.stl |
| DISP000-0001-002 | P0001 | LAYOUT DRAWING | P0001-001.png |
| DISP000-0001-003 | P0001 | INSTALLATION VIDEO | P0001-001.mp4 |
| DISP000-0001-004 | P0001 | DEVICE MODEL NAME INFORMATION | P0001-001.xml |
| DISP000-0001-005 | P0002 | 3D MODEL | P0002-001.stl |
| DISP000-0001-006 | P0002 | LAYOUT DRAWING | P0002-001.png |
| .. | .. | .. | .. |

| DATE | START TIME | END TIME | WORK ID | STAFF ID |
|------|-----------|----------|---------|----------|
| 20XX/M0/D0 | 13:00 | 14:00 | WORK001 | USER001 |
| 20XX/M0/D0 | 10:00 | 12:00 | WORK002 | USER002 |
| 20XX/M1/D1 | 15:00 | 16:30 | WORK001 | USER003 |
| 20XX/M1/D1 | 9:00 | 10:00 | WORK003 | USER001 |
| 20XX/M1/D1 | 10:00 | 10:30 | WORK004 | USER001 |
| .. | .. | .. | .. | .. |

Fig. 8

| STEP ID | STEP NAME | CONTENT | WORK TARGET DEVICE ID | WORK ID |
|---|---|---|---|---|
| STEP001-0001 | BOLT A REMOVAL | USE A WRENCH TO REMOVE BOLT A. | P0001 | WORK001 |
| STEP001-0002 | COVER B REMOVAL | REMOVE COVER B VERTICALLY. | P0008 | WORK001 |
| STEP001-0003 | PLUNGER C STOROKE CHECK | TURN ON THE POWER, AND CHECK THE OPERATING RANGE OF PLUNGER C. | P0005 | WORK001 |
| STEP001-0004 | PLUNGER C EXTRACTION | REMOVE PLUNGER C FROM THE MAIN BODY. | P0005 | WORK001 |
| STEP001-0005 | PLUNGER C INSPECTION | CHECK THAT THERE ARE NO SCRATCHES ON THE SURFACE OF PLUNGER C. | P0005 | WORK001 |
| .. | .. | .. | .. | .. |

91

TRUE WORK STEP

WORK STEPS RELATED TO P0005

PROXIMITY IN SEQUENCE OF STEPS

EVALUATE PROXIMITY IN SEQUENCE OF STEPS BASED ON EACH STEP ID $$score = \frac{1}{|N_{True} - N_{False}|}$$

$N_{true}$ : SEQUENTIAL NUMBER OF TRUE WORK STEP
$N_{false}$ : SEQUENTIAL NUMBER OF WORK STEP
RELATED TO P0005

PROXIMITY IN STEP CONTENT

USE A METHOD THAT CALCULATES SIMILARITY BETWEEN SENTENCES, SUCH AS Doc2Vec
(OUTPUT SIMILARITY IN RANGE OF 0.0 TO 1.0)

Fig. 9

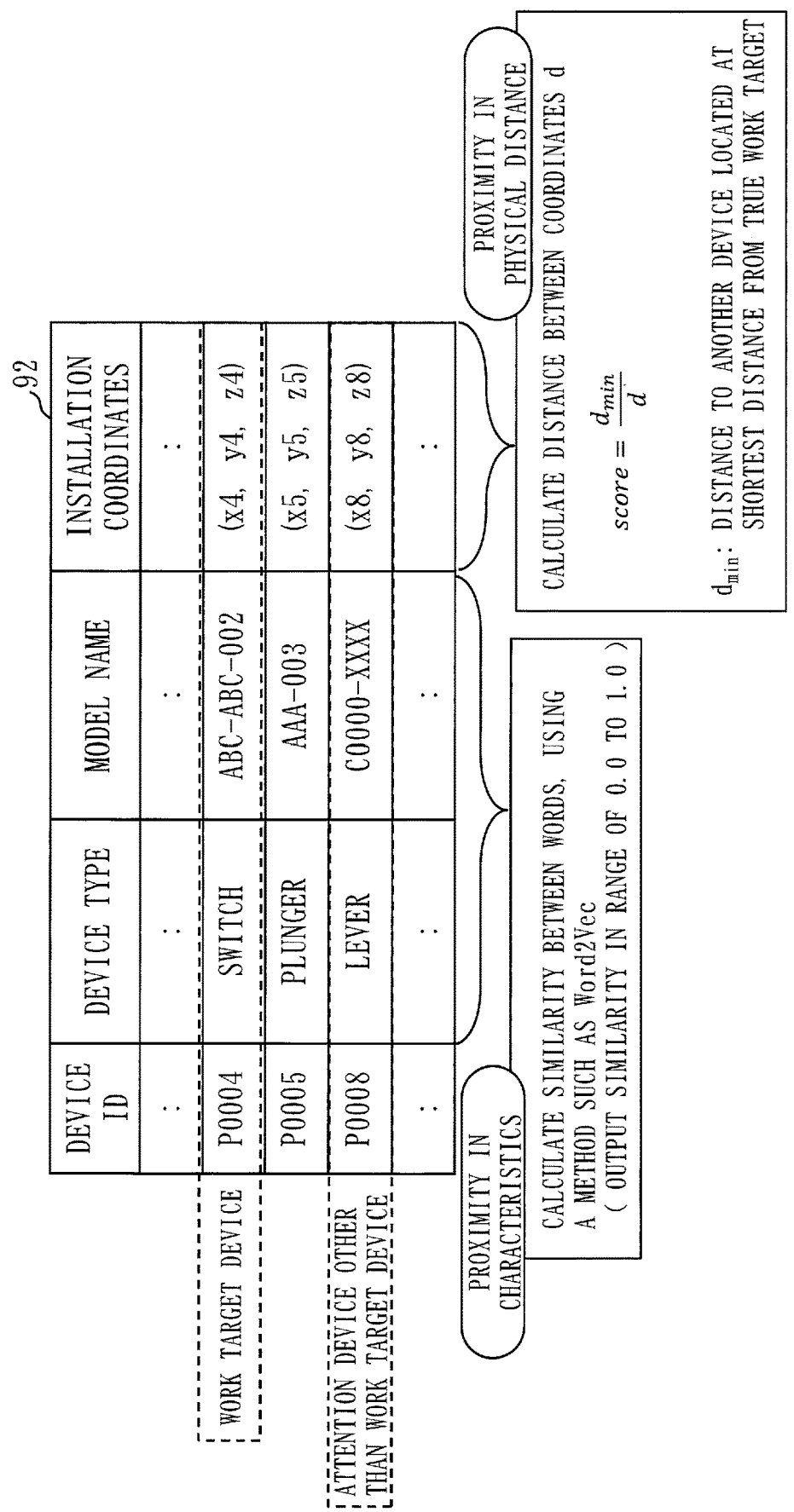

92

| DEVICE ID | DEVICE TYPE | MODEL NAME | INSTALLATION COORDINATES |
|---|---|---|---|
| .. | .. | .. | .. |
| P0004 | SWITCH | ABC-ABC-002 | (x4, y4, z4) |
| P0005 | PLUNGER | AAA-003 | (x5, y5, z5) |
| P0008 | LEVER | C0000-XXXX | (x8, y8, z8) |
| .. | .. | .. | .. |

WORK TARGET DEVICE

ATTENTION DEVICE OTHER THAN WORK TARGET DEVICE

PROXIMITY IN CHARACTERISTICS

CALCULATE SIMILARITY BETWEEN WORDS, USING A METHOD SUCH AS Word2Vec
( OUTPUT SIMILARITY IN RANGE OF 0.0 TO 1.0 )

PROXIMITY IN PHYSICAL DISTANCE

CALCULATE DISTANCE BETWEEN COORDINATES d $$score = \frac{d_{min}}{d}$$

$d_{min}$: DISTANCE TO ANOTHER DEVICE LOCATED AT SHORTEST DISTANCE FROM TRUE WORK TARGET

Fig. 10

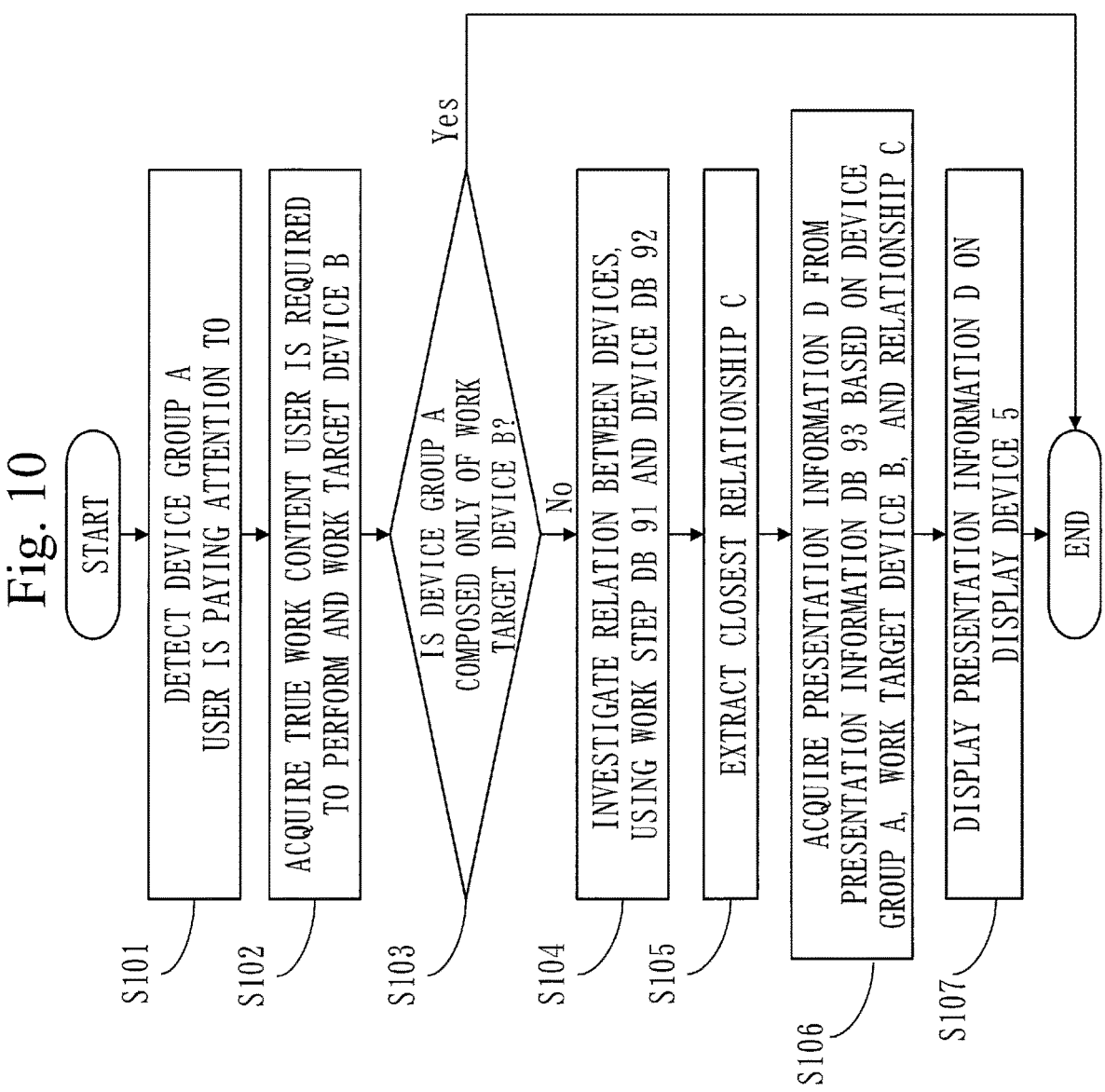

START

S101 — DETECT DEVICE GROUP A USER IS PAYING ATTENTION TO

S102 — ACQUIRE TRUE WORK CONTENT USER IS REQUIRED TO PERFORM AND WORK TARGET DEVICE B

S103 — IS DEVICE GROUP A COMPOSED ONLY OF WORK TARGET DEVICE B?

Yes

No

S104 — INVESTIGATE RELATION BETWEEN DEVICES, USING WORK STEP DB 91 AND DEVICE DB 92

S105 — EXTRACT CLOSEST RELATIONSHIP C

S106 — ACQUIRE PRESENTATION INFORMATION D FROM PRESENTATION INFORMATION DB 93 BASED ON DEVICE GROUP A, WORK TARGET DEVICE B, AND RELATIONSHIP C

S107 — DISPLAY PRESENTATION INFORMATION D ON DISPLAY DEVICE 5

END

| TRUE WORK TARGET DEVICE | DEVICE NAME | WORK TARGET DEVICE (OTHER THAN TRUE WORK TARGET DEVICE) USER IS PAYING ATTENTION TO | | | | | | |
|---|---|---|---|---|---|---|---|---|
| | | P0001 | P0002 | P0003 | P0004 | P0005 | P0006 | ... |
| | P0001 | | 0.8 | 1.0 | 0.5 | 0.2 | 0.3 | ... |
| | P0002 | 0.8 | | 1.0 | 1.0 | 1.0 | 1.0 | ... |
| | P0003 | 0.5 | 1.2 | | 1.0 | 1.0 | 1.0 | ... |
| | P0004 | 0.2 | 0.8 | 0.9 | | 1.2 | 1.0 | ... |
| | P0005 | 0.1 | 0.5 | 0.5 | 0.9 | | 1.2 | ... |
| | P0006 | 0.1 | 0.1 | 0.1 | 1.2 | 1.5 | | ... |
| | ... | ... | ... | ... | ... | ... | ... | |

| WORK TARGET DEVICE | DEVICE ID | DEVICE (OTHER THAN WORK TARGET DEVICE) USER IS PAYING ATTENTION TO | | | |
|---|---|---|---|---|---|
| | | P0001 | P0002 | P0003 | ... |
| | P0001 | | 1.0 | 1.0 | ... |
| | P0002 | 1.0 | | 1.0 | ... |
| | P0003 | 1.0 | 1.0 | | ... |
| | ... | ... | ... | ... | |

(a) UNIFORM WEIGHTS

94

| WORK TARGET DEVICE | DEVICE ID | DEVICE (OTHER THAN WORK TARGET DEVICE) USER IS PAYING ATTENTION TO | | | |
|---|---|---|---|---|---|
| | | P0001 | P0002 | P0004 | ... |
| | P0001 | | 1.0 | 0.6 | ... |
| | P0002 | 1.0 | | 0.6 | ... |
| | P0004 | 0.6 | 0.6 | | ... |
| | ... | ... | ... | ... | |

(b) WEIGHTS DEPENDING ON TYPES OF DEVICES

INFORMATION PROCESSING APPARATUS, INFORMATION PROCESSING METHOD, AND COMPUTER READABLE MEDIUM

CROSS REFERENCE TO RELATED APPLICATIONS

This application is a Continuation of PCT International Application No. PCT/JP2021/039343, filed on Oct. 25, 2021, which is hereby expressly incorporated by reference into the present application.

TECHNICAL FIELD

The present disclosure relates to an information processing apparatus, an information processing method, and an information processing program.

BACKGROUND ART

There is a technology that measures a line of sight of a user to detect an area that the user is looking at, and presents information associated with the detected area to the user. Patent Literature 1 discloses a technology that provides a user with an appropriate guidance video in an automatic teller machine (ATM) or the like by displaying a guidance video associated with an image that the user is looking at.

CITATION LIST

Patent Literature

Patent Literature 1: JP 2018-055320 A

SUMMARY OF INVENTION

Technical Problem

In assistance of workers at work sites or work education using virtual spaces or the like, there is a need for a technology to appropriately present information to a user who is a worker depending on confusion of the user in choosing a device. There are usually many types of work and many types of work target devices that are involved in this technology. Therefore, a problem is that realizing this technology based on the technology disclosed in Patent Literature 1 is not practical because the amount of association work would be enormous.

An object of the present disclosure is to appropriately present information to a user depending on confusion of the user in choosing a device in worker assistance at a work site, work education using a virtual space or the like, and so on by determining information to be presented to the user based on a relationship between an attention device group that the user who is working is paying attention to and a work target device. The work target device is a device corresponding to work to be performed by the user.

Solution to Problem

An information processing apparatus according to the present disclosure includes a work target detection unit to detect an attention device group composed of at least one device that a user who is working is paying attention to;

a confusion factor estimation unit to set each device, excluding a work target device, that is included in the attention device group as a target attention device, the work target device being a device corresponding to work that the user is required to perform, and calculate a relationship score that indicates a relationship between the target attention device and the work target device, and indicates a degree of confusion of the user in choosing between the target attention device and the work target device; and a presentation information control unit to refer to a presentation information database that records presentation information so as to acquire presentation information based on the calculated relationship score, the presentation information being information to be presented to the user to help the user to become aware of the work target device.

Advantageous Effects of Invention

According to the present disclosure, a confusion factor estimation unit calculates a relationship score based on an attention device group and a work target device, and a presentation information control unit acquires presentation information based on the relationship score. The relationship score is equivalent to a value indicating a relationship. Therefore, according to the present disclosure, information can be presented appropriately to a user depending on confusion of the user in choosing a device in worker assistance at a work site, work education using a virtual space or the like, and so on by determining information to be presented to the user based on a value indicating a relationship between the attention device group that the user who is working is paying attention to and the work target device.

BRIEF DESCRIPTION OF DRAWINGS

FIG. 2 is a figure describing data stored in a work step DB 91 according to Embodiment 1;

FIG. 3 is a figure describing data stored in a device DB 92 according to Embodiment 1;

FIG. 4 is a figure describing data stored in a presentation information DB 93 according to Embodiment 1;

FIG. 5 is a figure illustrating an example of a hardware configuration of the information processing apparatus 10 according to Embodiment 1;

FIG. 7 is a figure illustrating a specific example of a work schedule according to Embodiment 1;

FIG. 8 is a figure describing a method for calculating a relationship score;

FIG. 9 is a figure describing a method for calculating a relationship score;

FIG. 10 is a flowchart illustrating operation of the information processing apparatus 10 according to Embodiment 1;

FIG. 12 is a figure illustrating an example of the configuration of the information processing apparatus 10 according to Embodiment 2;

FIG. 13 is a figure illustrating an example of the configuration of the information processing apparatus 10 according to Embodiment 3;

FIG. 16 is a figure describing data stored in a relationship weight DB 94 according to Embodiment 4;

FIG. 19 is a figure describing how a relationship weight updating unit 70 according to Embodiment 5 updates relationship weights, where (a) is table data indicating uniform weights, and (b) is table data indicating weights depending on types of devices.

DESCRIPTION OF EMBODIMENTS

In the description and drawings of embodiments, the same elements and corresponding elements are denoted by the same reference sign. The description of elements denoted by the same reference sign will be suitably omitted or simplified. Arrows in figures mainly indicate flows of data or flows of processing. "Unit" may be suitably interpreted as "circuit", "step", "procedure", "process", or "circuitry".

Embodiment 1

This embodiment will be described below with reference to the drawings.

Description of Configuration

Figure 1:
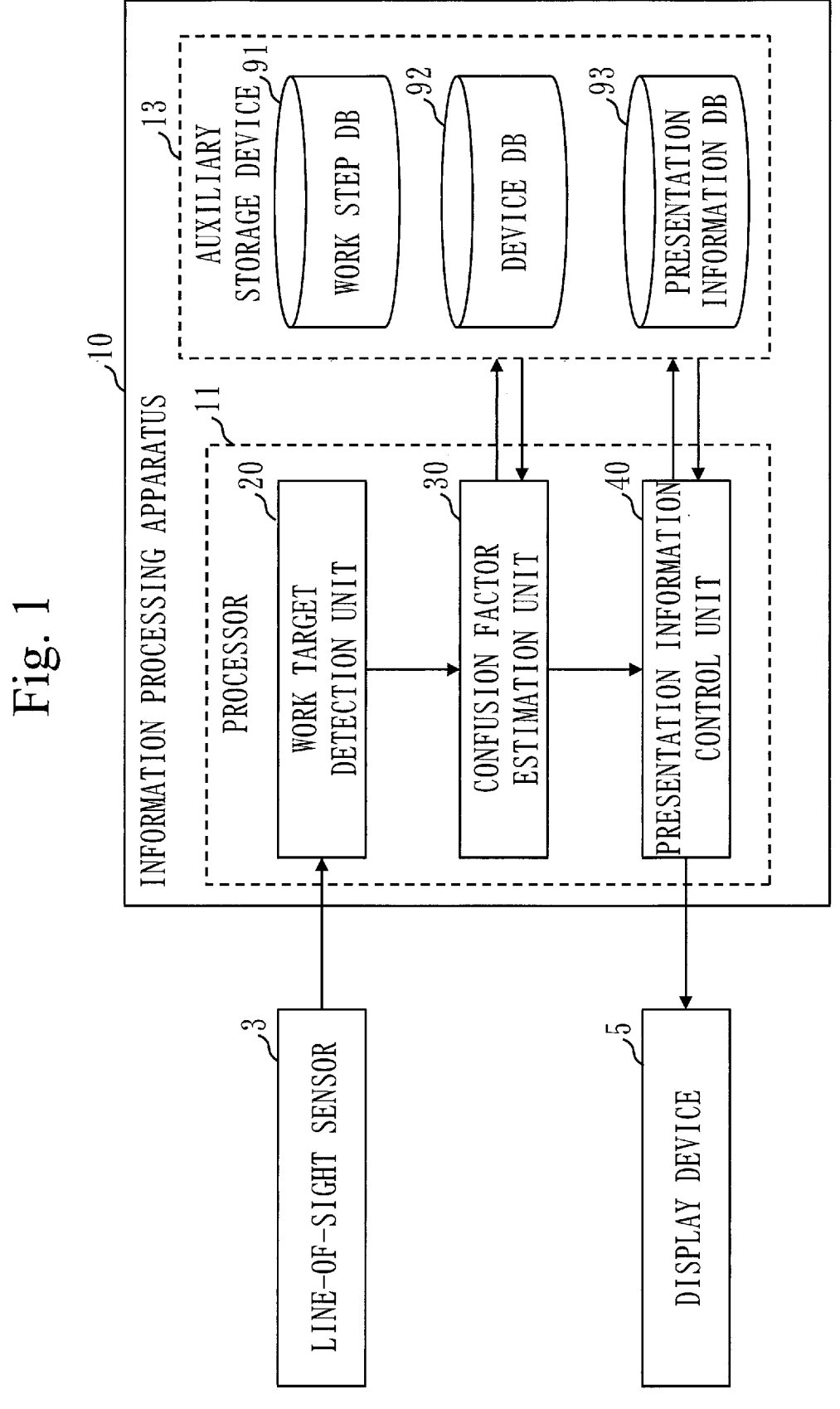
FIG. 1 is a figure illustrating an example of a configuration of an information processing apparatus 10 according to Embodiment 1.

FIG. 1 illustrates an example of a configuration of an information processing apparatus 10 according to this embodiment. As illustrated in FIG. 1, the information processing apparatus 10 includes a work target detection unit 20, a confusion factor estimation unit 30, a presentation information control unit 40, a work step DB 91, a device DB 92, and a presentation information DB 93. DB is an abbreviation for database.

The work target detection unit 20 detects an attention device group, and acquires information indicating a work target device. The attention device group is composed of at least one device that a user who is working is paying attention to. The work target device is a device that corresponds to work to be performed by the user. The work target device is determined according to a work schedule or the like. The work target device may be composed of two or more devices. There may be a case where the attention device group does not include the work target device. The work target detection unit 20 detects the attention device group based on an area that the user is looking at. This area is calculated based on data indicating lines of sight of the user measured by a line-of-sight sensor 3. The work target detection unit 20 may acquire the work schedule of the user from an external source, or may acquire user information and select the work schedule corresponding to the acquired user information from work schedules recorded in the information processing apparatus 10. The user information is information indicating an identifier or the like of the user.

The confusion factor estimation unit 30 sets each device, excluding the work target device, that is included in the attention device group as a target attention device, and estimates a confusion factor for calculating a relationship score, which is a score that indicates a relationship between the target attention device and the work target device and indicates a degree of confusion of the user in choosing between the target attention device and the work target device. The confusion factor estimation unit 30 may calculate the relationship score based on the content of the work to be performed by the user. The confusion factor estimation unit 30 calculates the relationship score for each confusion factor. The confusion factor is a factor that causes confusion for the user in choosing between the target attention device and the work target device.

The presentation information control unit 40 acquires presentation information based on the relationship score calculated by the confusion factor estimation unit 30. The presentation information is information that is presented to the user and helps the user to become aware of the work target device.

The work step DB 91 records data indicating work steps, the content of work to be performed on the target device, and so on. FIG. 2 is a figure describing data stored in the work step DB 91. As a specific example, the work step DB 91 stores data indicating a step ID, a step name, content, a work target device ID, and a work ID. ID is an abbreviation for identification.

The step ID indicates an identifier that identifies each step of the work.

The step name indicates a name given to each step of the work.

The content indicates a specific process to be performed in each step of the work.

The work target device ID indicates an identifier of the device to be handled in each step of the work.

The work ID indicates an identifier that identifies each set of work.

The device DB 92 records data indicating positional relationships of devices, device type names, and so on. As a specific example, the positional relationships of devices are indicated by a 3-dimension computer aided design (3D CAD) model or assembly data. FIG. 3 is a figure describing data stored in the device DB 92. As a specific example, the device DB 92 stores data indicating a device ID, a device type, a model name, and installation coordinates. The confusion factor estimation unit 30 may refer to the device DB 92 to search for devices, calculate a distance between the devices based on the installation coordinates of the devices, and calculate a relationship score using the calculated distance.

The device ID indicates an identifier that identifies each device.

The device type indicates a type of each device.

The model name indicates a model name of each device.

The installation coordinates indicate coordinates at which each device is installed.

The data stored in the device DB 92 may be 3D assembly data or the like instead of table data. By calculating the distance between devices using coordinate information of the devices included in assembly data, substantially the same effect as calculating the distance between devices using table data can be obtained.

FIG. 4 is a figure describing data stored in the presentation information DB 93. The presentation information DB 93 records presentation information, and as a specific example, stores data indicating a presentation information ID, a device ID, a type of presentation information, and a presentation information file name. Recording presentation information includes recording information that points to presentation information, such as a file name.

The presentation information ID indicates an identifier that identifies information to be presented to the user.

The device ID indicates an identifier that identifies a device corresponding to the information to be presented to the user.

The type of presentation information indicates a type of the information to be presented to the user.

The presentation information file name indicates a name of a file corresponding to the information to be presented to the user.

The presentation information control unit 40 searches the presentation information DB 93 for the information to be presented to the user, using the highest relationship score as a clue. As a specific example, when the presentation information DB 93 contains table data as indicated in FIG. 4, the presentation information control unit 40 searches the table data and acquires a file indicated by the search result. It is assumed that table data or the like that indicates each relationship between a type of relationship corresponding to a relationship score and a type of presentation information has been prepared in advance.

The information processing apparatus 10 is connected with the line-of-sight sensor 3 and a display device 5. The information processing apparatus 10 may acquire data measured by the line-of-sight sensor 3 without being connected with the line-of-sight sensor 3.

The line-of-sight sensor 3 is a sensor that measures a line of sight of the user. The line-of-sight sensor 3 may be a camera or infrared sensor installed in a work environment, or may be mounted on a wearable device worn by the user. The wearable device is, as a specific example, a head-mounted display (HMD).

The display device 5 is a device that displays images, such as a liquid crystal display (LCD).

Figure 5:
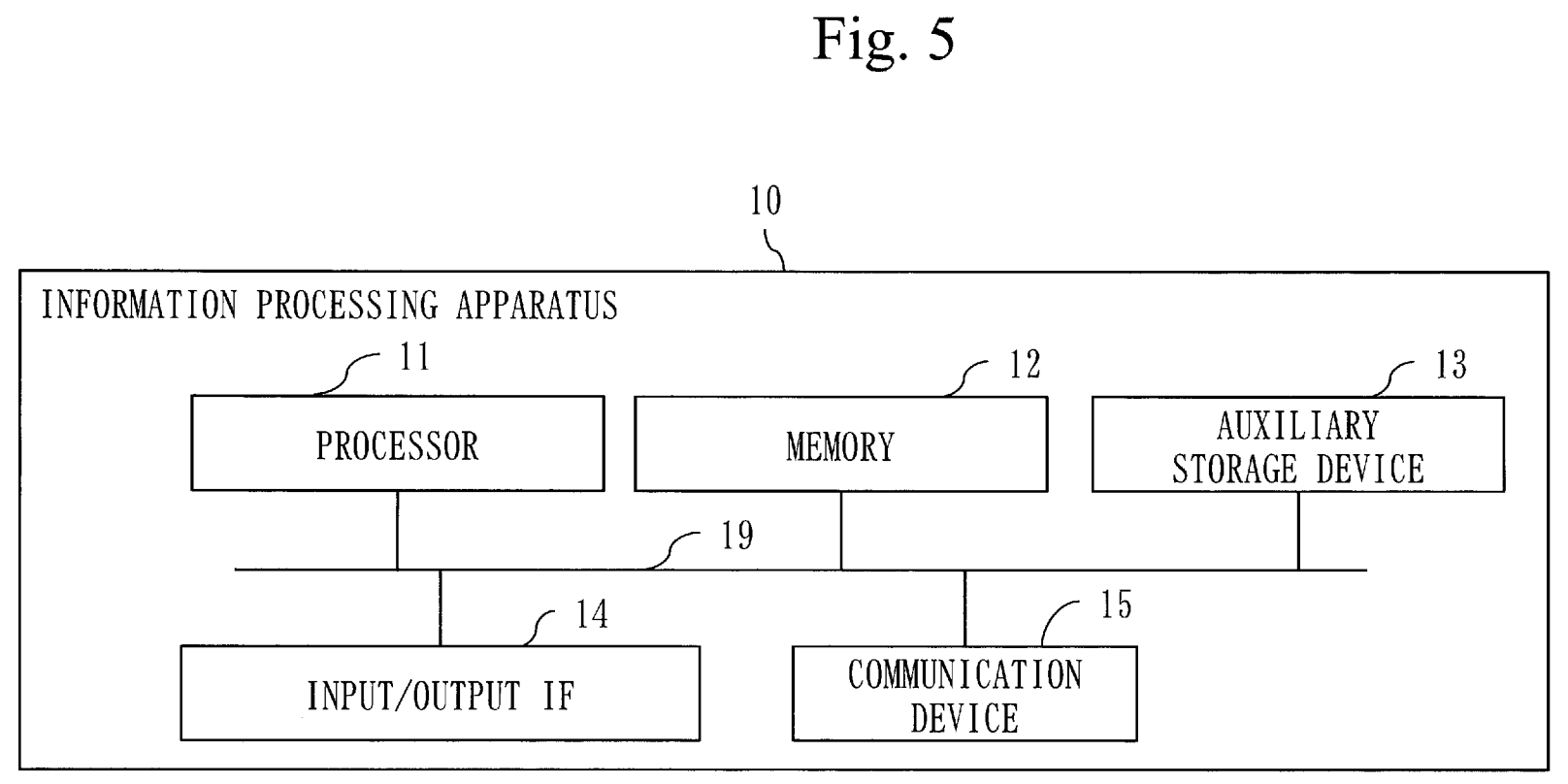

FIG. 5 illustrates an example of a hardware configuration of the information processing apparatus 10 according to this embodiment. The information processing apparatus 10 is composed of a computer. The information processing apparatus 10 may be composed of a plurality of computers.

As illustrated in FIG. 5, the information processing apparatus 10 is a computer that includes hardware such as a processor 11, a memory 12, an auxiliary storage device 13, an input/output interface (IF) 14, and a communication device 15. These hardware components are connected with one another through a signal line 19.

The processor 11 is an integrated circuit (IC) that performs operational processing, and controls the hardware included in the computer. The processor 11 is, as a specific example, a central processing unit (CPU), a digital signal processor (DSP), or a graphics processing unit (GPU).

The information processing apparatus 10 may include a plurality of processors as an alternative to the processor 11. The plurality of processors share the role of the processor 11.

The memory 12 is, typically, a volatile storage device. The memory 12 is also called a main storage device or a main memory. The memory 12 is, as a specific example, a random access memory (RAM). Data stored in the memory 12 is saved in the auxiliary storage device 13 as necessary.

The auxiliary storage device 13 is, typically, a non-volatile storage device. The auxiliary storage device 13 is, as a specific example, a read only memory (ROM), a hard disk drive (HDD), or a flash memory. Data stored in the auxiliary storage device 13 is loaded into the memory 12 as necessary.

The memory 12 and the auxiliary storage device 13 may be configured integrally.

The input/output IF 14 is a port to which an input device and an output device are connected. The input/output IF 14 is, as a specific example, a Universal Serial Bus (USB) terminal. The input device is, as a specific example, a keyboard and a mouse. The output device is, as a specific example, a display.

The communication device 15 is a receiver and a transmitter. The communication device 15 is, as a specific example, a communication chip or a network interface card (NIC).

Each unit of the information processing apparatus 10 may use the input/output IF 14 and the communication device 15 as appropriate when communicating with other devices and so on.

The auxiliary storage device 13 stores an information processing program. The information processing program is a program that causes a computer to realize the functions of each unit included in the information processing apparatus 10. The information processing program is loaded into the memory 12 and executed by the processor 11. The functions of each unit included in the information processing apparatus 10 are realized by software.

Data used when the information processing program is executed, data obtained by executing the information processing program, and so on are stored in a storage device as appropriate. Each unit of the information processing apparatus 10 uses the storage device as appropriate. As a specific example, the storage device is composed of at least one of the memory 12, the auxiliary storage device 13, a register in the processor 11, and a cache memory in the processor 11. Data and information may have substantially the same meaning. The storage device may be independent of the computer.

The functions of the memory 12 and the auxiliary storage device 13 may be realized by other storage devices.

The information processing program may be recorded in a computer readable non-volatile recording medium. The non-volatile recording medium is, as a specific example, an optical disc or a flash memory. The information processing program may be provided as a program product.

Description of Operation

A procedure for operation of the information processing apparatus 10 is equivalent to an information processing method. A program that realizes the operation of the information processing apparatus 10 is equivalent to the information processing program.

Figure 6:
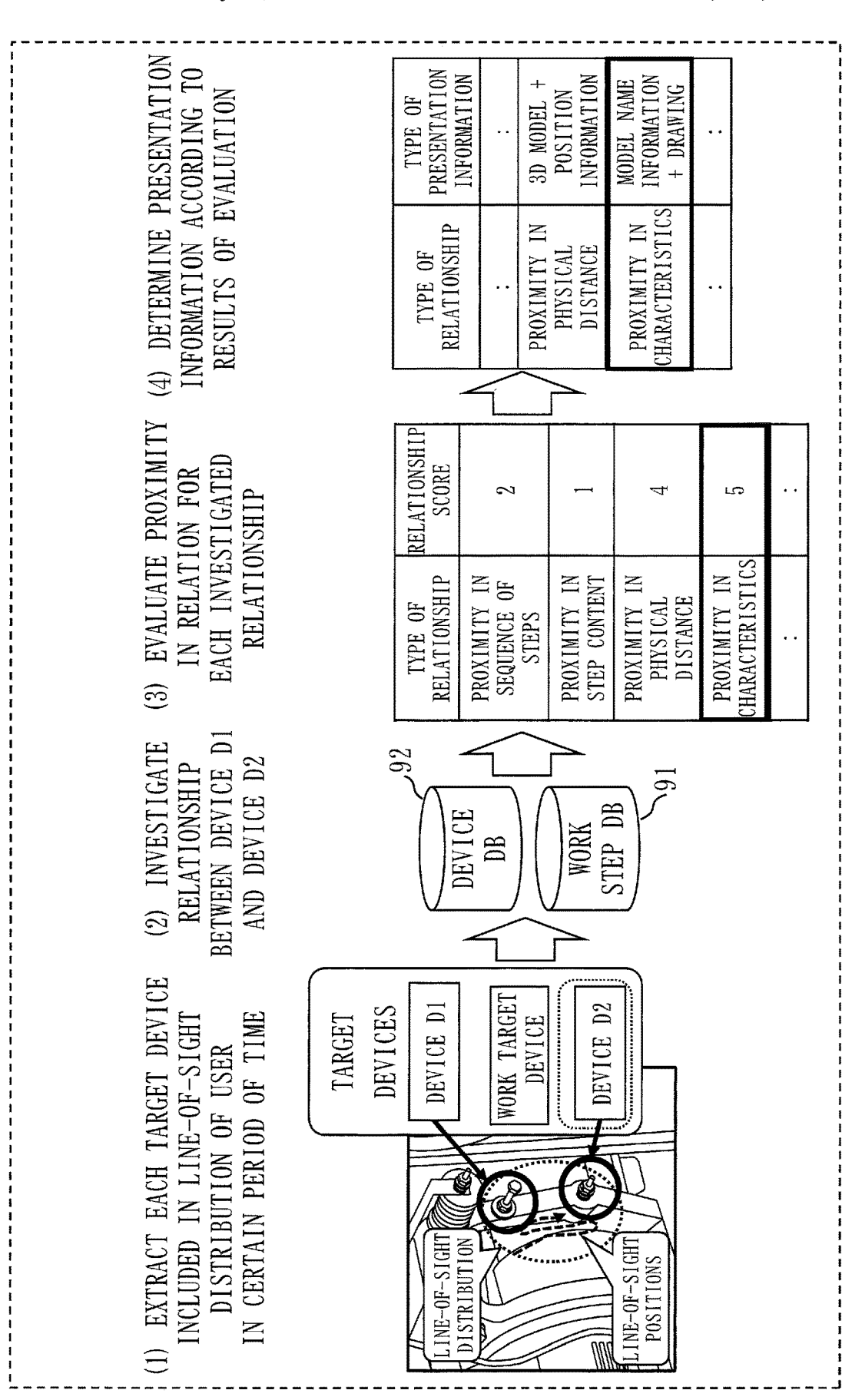
FIG. 6 is a figure describing an outline of operation of the information processing apparatus 10 according to Embodiment 1.

FIG. 6 is a figure describing an outline of the operation of the information processing apparatus 10. Referring to FIG. 6, the outline of the operation of the information processing apparatus 10 will be described.

First, the work target detection unit 20 extracts each target device included in a line-of-sight distribution of the user in a certain period of time. The work target detection unit 20 acquires information indicating the work target device by referring to the work schedule of the day, information indicating the device that has been operated most recently, or the like. It is assumed here that the work target device is a device D2, but the user is confused as to whether to choose a device D1 or the device D2 as the work target device.

Next, the confusion factor estimation unit 30 investigates a relationship between the device D1 and the device D2. At this time, the confusion factor estimation unit 30 may refer to the work step DB 91, and evaluate proximity in sequence of steps or similarity in step content between the step related to the device D1 and the step related to the device D2. Alternatively, the confusion factor estimation unit 30 may refer to design data, CAD data, or the like indicated in the device DB 92, and evaluate similarity in type between the device D1 and the device D2, proximity in physical distance between the device D1 and the device D2, and so on.

Next, the confusion factor estimation unit 30 evaluates proximity in relation for each investigated relationship.

Next, the presentation information control unit 40 determines presentation information based on the results of evaluation by the confusion factor estimation unit 30. At this time, as a specific example, rules regarding correspondences between types of relationship and types of presentation information are set in advance, and the presentation information control unit 40 determines presentation information in accordance with the set rules.

FIG. 7 illustrates a specific example of the work schedule. As a specific example, the work schedule is composed of information indicating a date, start time, end time, a work ID, and a staff ID.

The date indicates a date on which the user performs the work.

The start time indicates time at which the user starts the work.

The end time indicates time at which the user ends the work.

The work ID indicates an identifier that identifies the work.

The staff ID indicates an identifier that identifies the user who is in charge of the work.

FIG. 8 is a figure describing a method for calculating a relationship score. As a specific example, the confusion factor estimation unit 30 calculates a relationship score by referring to the work schedule and the work step DB 91.

In FIG. 8, it is assumed the step ID that indicates a true work step, which is the work step that the user is required to perform next, is STEP001-0002 and the user is paying attention to a device P0005 in addition to a device P0008. In this case, the confusion factor estimation unit 30 evaluates a relationship between the true work step and each work step related to the device P0005. At this time, the confusion factor estimation unit 30 may calculate a relationship score based on <proximity in sequence of steps> using step IDs as clues, or may calculate a relationship score based on <similarity in step content>.

Each of <proximity in sequence of steps> and <similarity in step content>, which are types of relationship, will be described below.

<Proximity in Sequence of Steps>

If the value of a relationship score regarding <proximity in sequence of steps> is large, it is considered that the user is confused because the steps are close to each other in the sequence of steps.

A specific example of a method for calculating a relationship score regarding <proximity in sequence of steps> will be described.

First, the confusion factor estimation unit 30 uses the name or the like of each device included in the device group A as a key, and searches the work schedule for a work step that targets the device corresponding to each key.

Next, the confusion factor estimation unit 30 investigates proximity between the sequential number of each retrieved work step and the sequential number of the true work step, and calculates a relationship score so that the closer the sequential numbers to each other, the higher the value of the relationship score.

When the work step DB 91 is a graph database, the distance between nodes corresponding to work steps may be used to calculate proximity between the work steps. In this case, attribute information of an edge is equivalent to a type of relationship such as <proximity in sequence of steps>.

<Similarity in Step Content>

If the value of a relationship score regarding <similarity in step content> is large, it is considered that the user is confused because of similarity in the content of work.

A specific example of a method for calculating a relationship score regarding <similarity in step content> will be described.

First, the confusion factor estimation unit 30 uses the name or the like of each device included in the device group A as a key, and searches the work schedule for a work step that targets the device corresponding to each key.

Next, the confusion factor estimation unit 30 compares the text of the retrieved work step with the text of the true work step, and calculates a relationship score based on the result of comparison. At this time, the confusion factor estimation unit 30 uses, for example, a method that compares distances between words by converting words into vectors, such as Word2Vec.

FIG. 9 is a figure describing a method for calculating a relationship score. As a specific example, the confusion factor estimation unit 30 calculates a relationship score by referring to the work schedule and the device DB 92.

In FIG. 9, it is assumed the step ID that indicates the true work step is STEP001-0002 and the user is paying attention to the device P0005 in addition to the device P0008. In this case, the confusion factor estimation unit 30 may calculate a relationship score based on <proximity in physical distance>, or may calculate a relationship score based on <similarity in characteristics>.

Each of <proximity in physical distance> and <similarity in characteristics>, which are types of relationship, will be described below.

<Proximity in Physical Distance>

A specific example of a method for calculating a relationship score regarding <proximity in physical distance> will be described.

The confusion factor estimation unit 30 calculates the distance between devices being investigated by referring to data representing position information of the devices, such as 3D CAD data or building information modeling (BIM), and calculates a relationship score so that the shorter the distance, the higher the value of the relationship score.

<Similarity in Characteristics>

A specific example of a method for calculating a relationship score regarding <similarity in characteristics> will be described. The characteristics of a device are, as a specific example, a shape of the device, a model number of the device, a combination of these, or the like.

The confusion factor estimation unit 30 calculates similarity in characteristics or the like between devices by referring to information indicating properties included in a 3D model, BIM data, or the like or indicating a parts table or the like. The properties are, as a specific example, a device model name and a device type. The device type is, as a specific example, a bolt or a brake. The confusion factor estimation unit 30 calculates a relationship score so that the value of the relationship score is high when the types match between devices or when the model names match between devices, for example. When calculating similarity in characteristics, the confusion factor estimation unit 30 may calculate similarity between words using a method such as Word2Vec.

FIG. 10 is a flowchart illustrating an example of the operation of the information processing apparatus 10. Referring to FIG. 10, the operation of the information processing apparatus 10 will be described.

(Step S101)

The work target detection unit 20 detects the device group A that the user is paying attention to based on data measured by the line-of-sight sensor 3. The device group A is equivalent to the attention device group. A method for detecting the device group A is, as a specific example, a method in which a line-of-sight distribution of the user is created using line-of-sight images of the user and viewpoint position information of the user acquired in a certain period of time, and each device included in the created line-of-sight distribution is detected as the device group A. As a specific example, the viewpoint position of the user is acquired by capturing an image of the position of the iris of the user with a camera or detecting it with an infrared sensor or the like.

(Step S102)

The work target detection unit 20 refers to the work schedule, and acquires information indicating the true work content that the user is required to perform and the work target device B.

The information indicating the true work content and the work target device B is acquired by referring to the work schedule for the day, work completion information input by the user, or the like. The work target detection unit 20 may estimate the work content and the work target device B based on movement data of the user.

(Step S103)

The confusion factor estimation unit 30 determines whether the device group A is composed only of the work target device B.

If the device group A is composed only of the work target device B, it is considered that the user is not confused, so that the information processing apparatus 10 ends processing of this flowchart. In other cases, the information processing apparatus 10 proceeds to step S104.

In step S104 and subsequent steps, the confusion factor estimation unit 30 investigates a relationship with each device included in the device group A if the work target device B is included in the device group A, and investigates a relationship between each device included in the device group A and the work target device B in other cases.

(Step S104)

The confusion factor estimation unit 30 refers to the work step DB 91 and the device DB 92, and investigates the relationship between each device, excluding the work target device B, that is included in the device group A and the work target device B. At this time, the confusion factor estimation unit 30 calculates a relationship score.

(Step S105)

The presentation information control unit 40 extracts a relationship C that is the closest by referring to each relationship score calculated by the confusion factor estimation unit 30.

In the example illustrated in FIG. 6, the relationship score corresponding to <similarity in characteristics> is the highest. Therefore, the presentation information control unit 40 extracts <similarity in characteristics> as the relationship C.

(Step S106)

The presentation information control unit 40 selects a type of presentation information based on the device group A, the work target device B, and the relationship C, and acquires presentation information D according to the selected type of presentation information by referring to the presentation information DB 93. At this time, the presentation information control unit 40 refers to information that indicates correspondences between types of relationship and types of presentation information.

In the example indicated in FIG. 6, the type of presentation information corresponding to <similarity in characteristics> is "model name information+drawing". Therefore, the presentation information control unit 40 acquires data indicating the model name information and drawing of the work target device as the presentation information D.

(Step S107)

The presentation information control unit 40 displays the presentation information D acquired in step S106 on the display device 5.

Description of Effects of Embodiment 1

As described above, according to this embodiment, each device that the user is paying attention to is extracted, and a type of relationship and proximity of relationship between each extracted device and the work target device are calculated by referring to work steps, device information, or the like, and then information is presented to the user depending on the calculated result. Therefore, according to this embodiment, appropriate information can be presented to the user who is confused in choosing between the work target device and another device without performing a huge amount of association work.

Other Configurations

<Variation 1>

Figure 11:
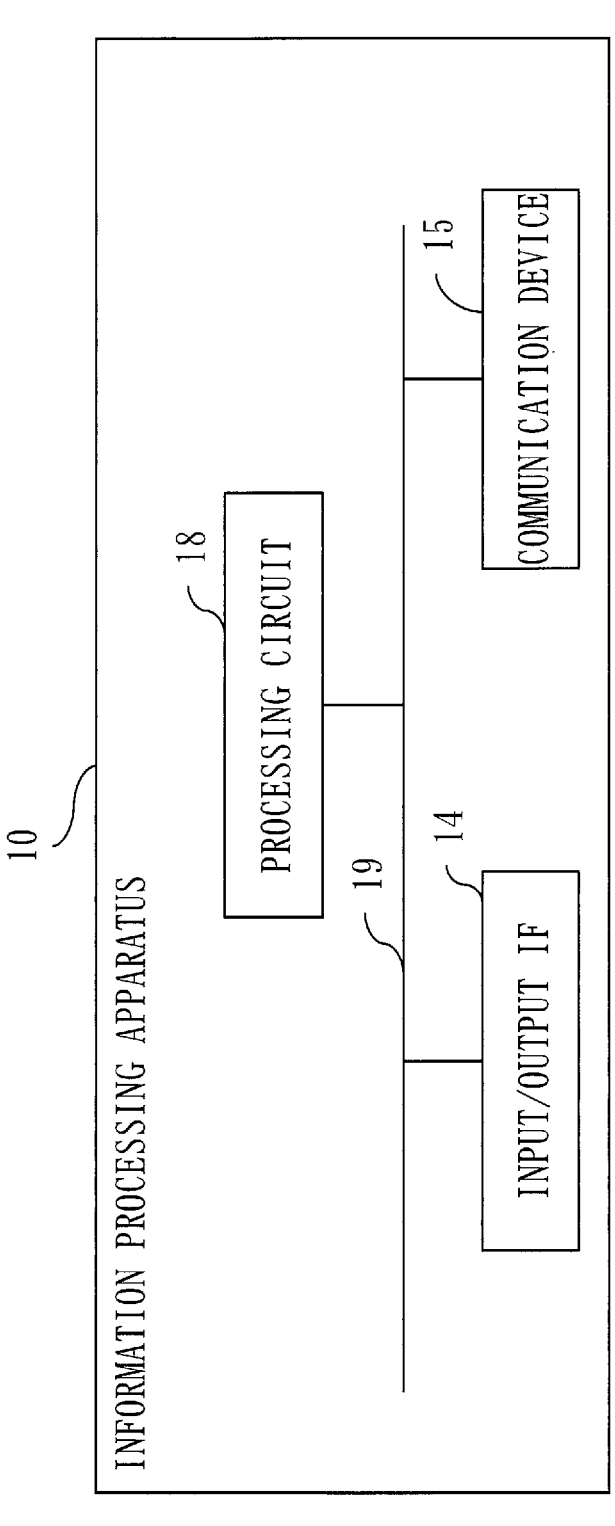
FIG. 11 is a figure illustrating an example of the hardware configuration of the information processing apparatus 10 according to a variation of Embodiment 1.

FIG. 11 illustrates an example of a hardware configuration of the information processing apparatus 10 according to this variation.

The information processing apparatus 10 includes a processing circuit 18 in place of the processor 11, in place of the processor 11 and the memory 12, in place of the processor 11 and the auxiliary storage device 13, or in place of the processor 11, the memory 12, and the auxiliary storage device 13.

The processing circuit 18 is hardware that realizes at least part of the units included in the information processing apparatus 10.

The processing circuit 18 may be dedicated hardware, or may be a processor that executes programs stored in the memory 12.

When the processing circuit 18 is dedicated hardware, the processing circuit 18 is, as a specific example, a single circuit, a composite circuit, a programmed processor, a parallel-programmed processor, an application specific integrated circuit (ASIC), a field programmable gate array (FPGA), or a combination of these.

The information processing apparatus 10 may include a plurality of processing circuits as an alternative to the processing circuit 18. The plurality of processing circuits share the role of the processing circuit 18.

In the information processing apparatus 10, some functions may be realized by dedicated hardware, and the remaining functions may be realized by software or firmware.

As a specific example, the processing circuit 18 is realized by hardware, software, firmware, or a combination of these.

The processor 11, the memory 12, the auxiliary storage device 13, and the processing circuit 18 are collectively called "processing circuitry". That is, the functions of the functional constituent elements of the information processing apparatus 10 are realized by the processing circuitry.

The information processing apparatus 10 according to other embodiments may also be configured in the same manner as this variation.

Embodiment 2

Differences from the embodiment described above will be mainly described below with reference to the drawings.

Description of Configuration

Figure 12:
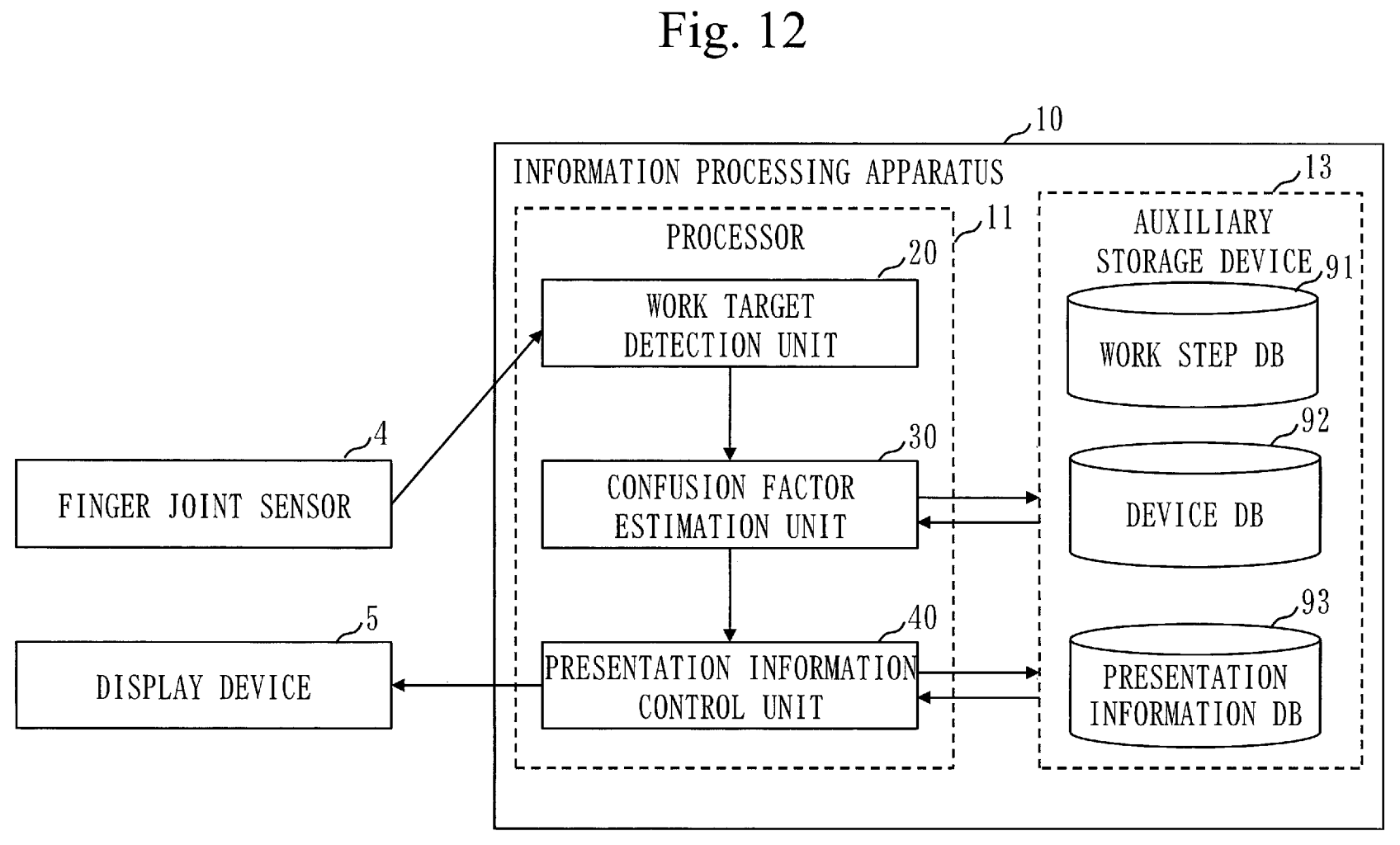

FIG. 12 illustrates an example of the configuration of the information processing apparatus 10 according to this embodiment. The information processing apparatus 10 is connected with a finger joint sensor 4. The information processing apparatus 10 may acquire data measured by the finger joint sensor 4 without being connected with the finger joint sensor 4.

The information processing apparatus 10 according to this embodiment differs from the information processing apparatus 10 according to Embodiment 1 mainly in that the work target detection unit 20 detects the attention device group based on the positions of finger joints of the user.

Description of Operation

The operation of the information processing apparatus 10 according to this embodiment that is different from the operation of the information processing apparatus 10 according to Embodiment 1 will be mainly described below. (Step S101)

This step is substantially the same as step S101 according to Embodiment 1. However, the work target detection unit 20 uses data measured by the finger joint sensor 4 in place of data measured by the line-of-sight sensor 3.

Description of Effects of Embodiment 2

As described above, according to this embodiment, by using a sensor that acquires positions of finger joints in place of a sensor that acquires positions being looked at, substantially the same effects as the effects according to Embodiment 1 can be obtained.

Other Configurations

<Variation 2>

In step S101, the work target detection unit 20 may use both the data measured by the line-of-sight sensor 3 and the data measured by the finger joint sensor 4.

Embodiment 3

Differences from the embodiments described above will be mainly described below with reference to the drawings.

Description of Configuration

Figure 13:
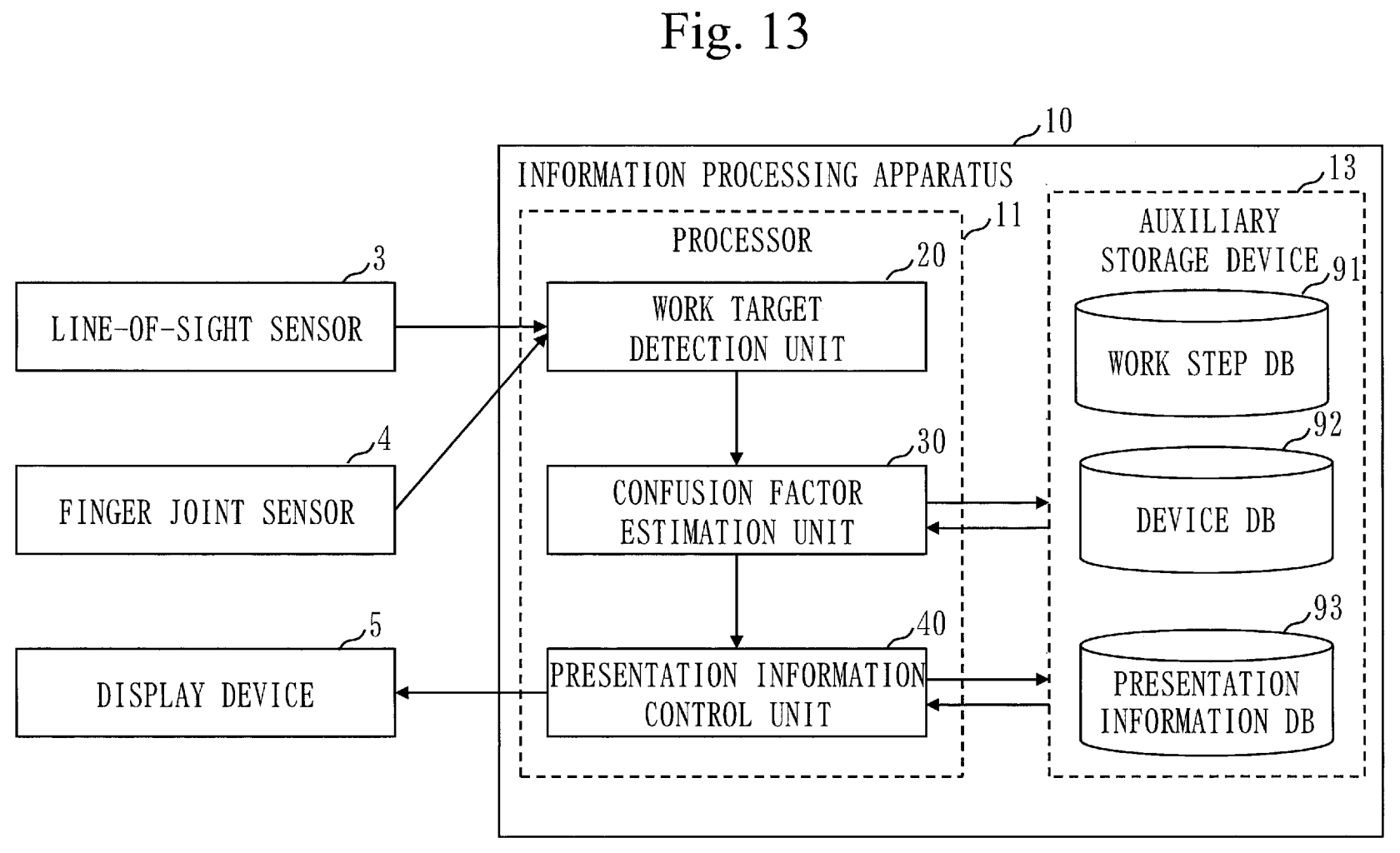

FIG. 13 illustrates an example of the configuration of the information processing apparatus 10 according to this embodiment. The information processing apparatus 10 is connected with both the line-of-sight sensor 3 and the finger joint sensor 4.

The information processing apparatus 10 according to this embodiment differs from the information processing apparatus 10 according to Embodiment 1 mainly in that the work target detection unit 20 detects the attention device group based on both the area that the user is looking at and the positions of finger joints of the user.

Description of Operation

The operation of the information processing apparatus 10 according to this embodiment that is different from the operation of the information processing apparatus 10 according to Embodiment 1 will be mainly described below. (Step S101)

This step is substantially the same as step S101 according to Embodiment 1. However, the work target detection unit 20 detects the device group A that the user is paying attention to based on the data measured by the line-of-sight sensor 3 and the data measured by the finger joint sensor 4. (Step S102)

This step is substantially the same as step S102 according to Embodiment 1. However, if the device group A includes a plurality of devices including the work target device B and if the fingers of the user remain close to the work target device B, the work target detection unit 20 determines that the user is not confused, and excludes each device, other than the work target device B, that is included in the device group A from the device group A.

Description of Effects of Embodiment 3

If only data indicating the line of sight of the user is used, it may be incorrectly detected that "the user is confused" even if the user is not actually confused. However, according to this embodiment, by using both the line of sight and the positions of finger joints of the user, incorrect detection can be avoided. As a result, according to this embodiment, more appropriate information can be presented to the user.

Embodiment 4

Differences from the embodiments described above will be mainly described below with reference to the drawings.

Description of Configuration

Figure 14:
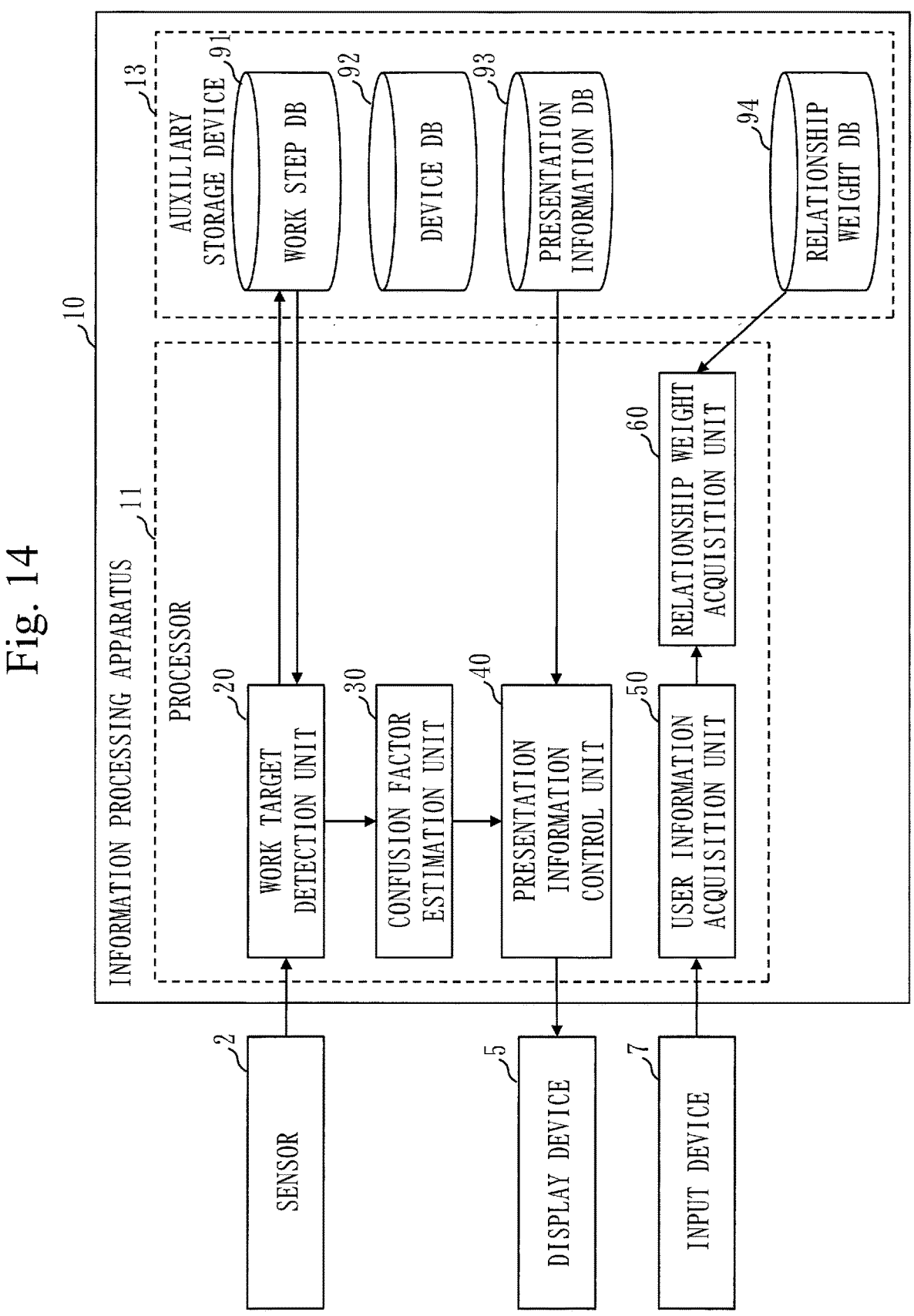
FIG. 14 is a figure illustrating an example of the configuration of the information processing apparatus 10 according to Embodiment 4.

FIG. 14 illustrates an example of the configuration of the information processing apparatus 10 according to this embodiment.

The information processing apparatus 10 according to this embodiment includes a user information acquisition unit 50, a relationship weight acquisition unit 60, and a relationship weight DB 94 in addition to the constituent elements included in the information processing apparatus 10 according to Embodiment 1. The information processing apparatus 10 is connected with a sensor 2 and an input device 7.

The user information acquisition unit 50 acquires user information.

The relationship weight acquisition unit 60 acquires relationship weights from the relationship weight DB 94 as appropriate. A relationship weight is a weight parameter for calculating a relationship score, and is defined between each device, excluding the work target device, that is included in the attention device group and the work target device. The value of a weight parameter is set for each combination of devices. The value of a weight parameter may be set based on attributes of the user. The attributes of the user are, as a specific example, a length of service of the user and a past work error history of the user.

Figure 15:
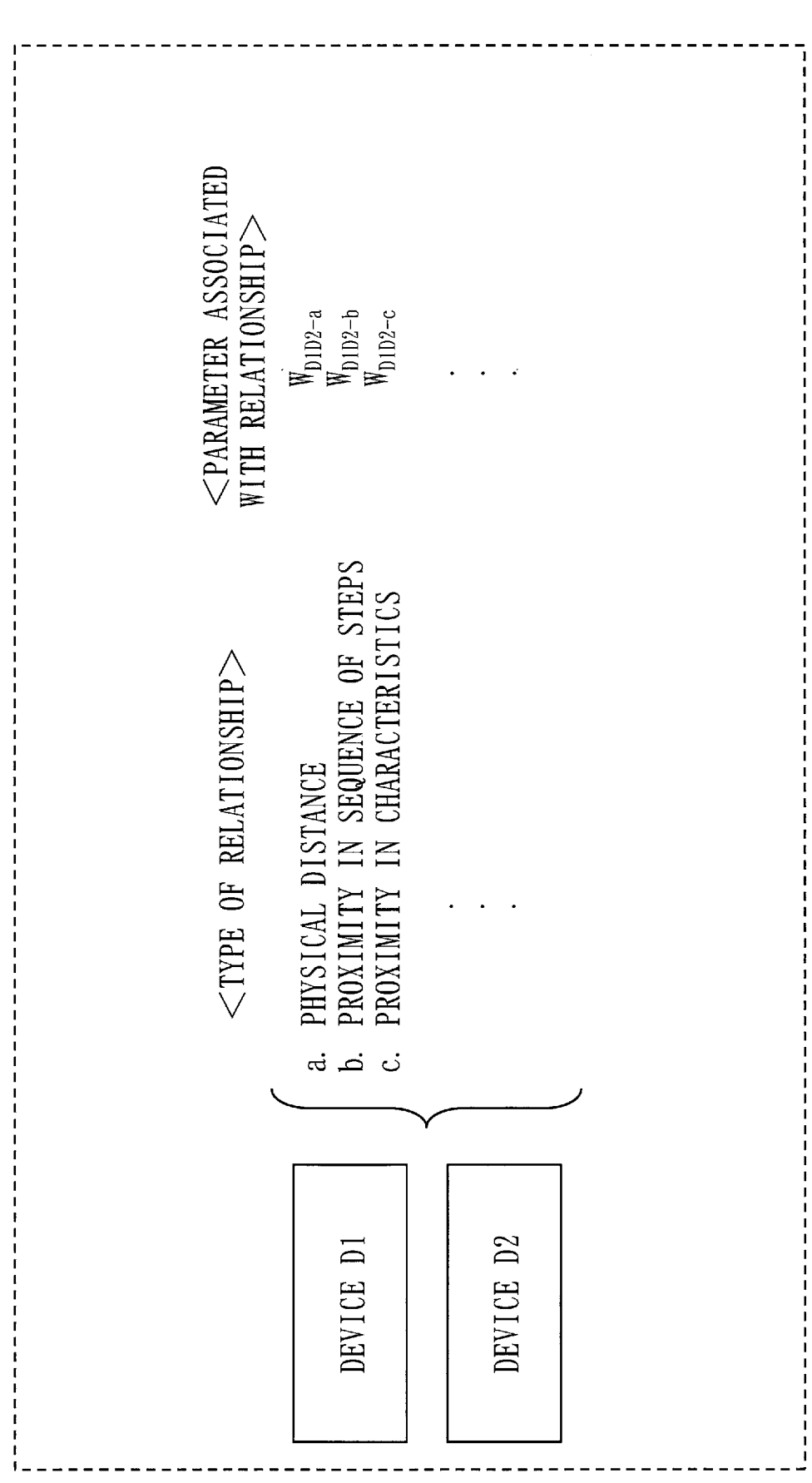
FIG. 15 is a figure describing relationship weights according to Embodiment 4.

When there are a plurality of types of relationship between two devices, the weight parameter corresponding to the combination of the two devices may be prepared for each type of relationship of the plurality of types of relationship. FIG. 15 is a figure describing relationship weights when there are a plurality of types of relationship between two devices. FIG. 15 indicates weight parameters that correspond to the combination of the device D1 and the device D2 and concern different types of relationship. $W_{D1D2-a}$ indicates a weight parameter concerning a physical distance, $W_{D1D2-b}$ indicates a weight parameter concerning proximity in the sequence of work steps, and $W_{D1D2-c}$ indicates a weight parameter concerning proximity in characteristics. As a specific example, it is assumed that when a relationship score between the device D1, which is the work target device, and the device D2, which is not the work target device, is calculated, the weight parameter corresponding to the device D1 and the device D2 and concerning proximity in the sequence of work steps is 0.8. In this case, the value of the relationship score corresponding to the device D1 and the device D2 and concerning proximity in the sequence of work steps is 0.8 times the value of the relationship score for the combination of the device D1 and the device D2 and concerning proximity in the sequence of work steps calculated without using the relationship weight.

The confusion factor estimation unit 30 calculates the relationship score using the relationship weight.

The sensor 2 is a collective term for the line-of-sight sensor 3 and the finger joint sensor 4.

The input device 7 is an input device such as a keyboard.

The relationship weight DB 94 is a database that records relationship weights.

FIG. 16 is a figure describing the relationship weight DB 94. In FIG. 16, each row indicates the work target device, and each column indicates a device that the user is paying attention to among devices other than the work target device. As a specific example, data as indicated in FIG. 16 is prepared for each user. Data as indicated in FIG. 16 may be prepared for each type of relationship.

Description of Operation

The operation of the information processing apparatus 10 according to this embodiment that is different from the operation of the information processing apparatus 10 according to Embodiment 1 will be mainly described below.
(Step S104)

This step is substantially the same as step S104 according to Embodiment 1. However, when calculating a relationship score, the confusion factor estimation unit 30 refers to the relationship weight DB 94, and uses the relationship weight corresponding to the relationship score to be calculated. At this time, the confusion factor estimation unit 30 acquires user information from the input device 7, and acquires the weight parameter associated with the acquired user information from the relationship weight DB 94.

Description of Effects of Embodiment 4

As described above, according to this embodiment, by estimating a confusion factor using the relationship weight suitable for the characteristics of each user, more appropriate information can be presented to the user.

Embodiment 5

Differences from the embodiments described above will be mainly described below with reference to the drawings.

Description of Configuration

Figure 17:
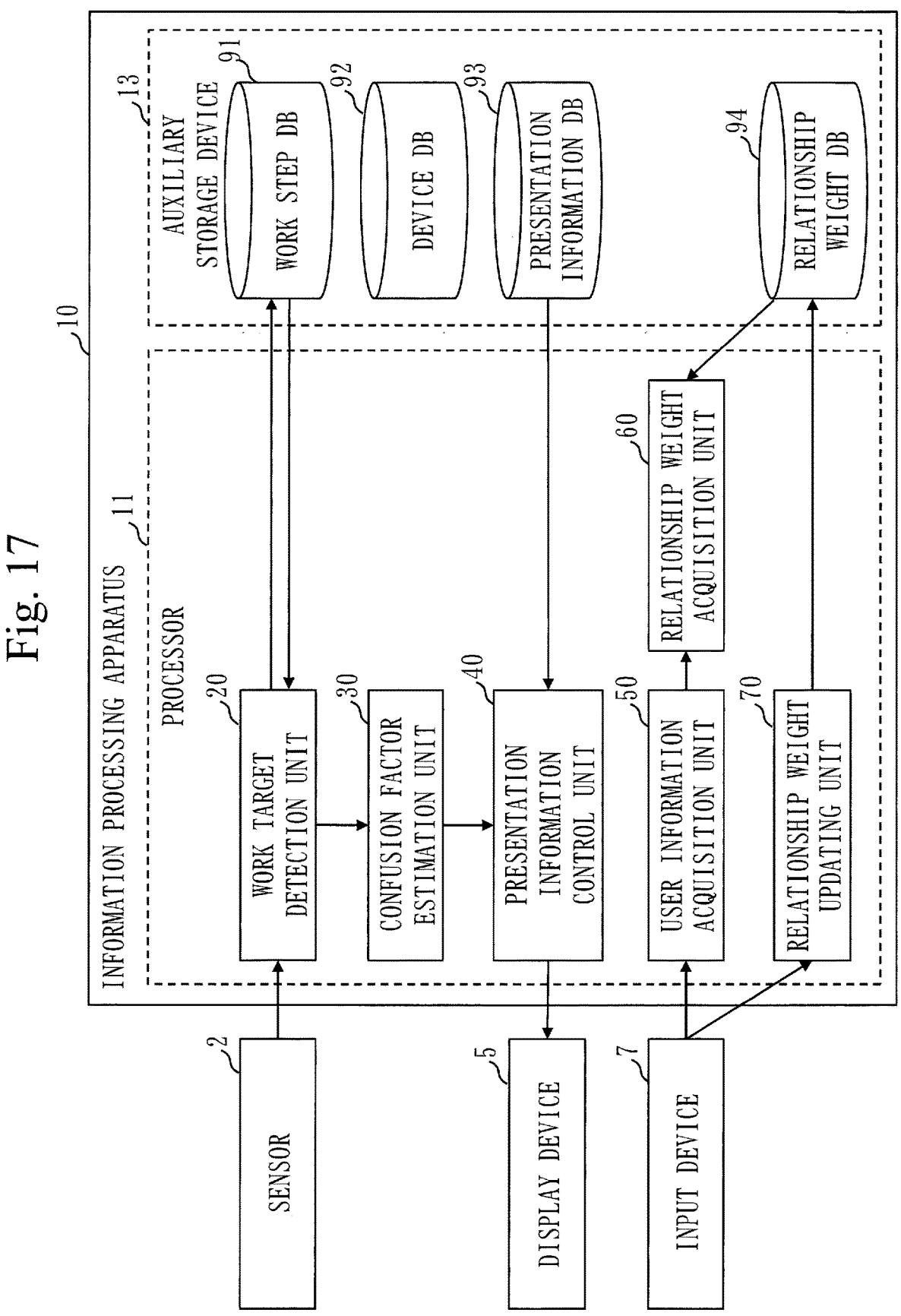
FIG. 17 is a figure illustrating an example of the configuration of the information processing apparatus 10 according to Embodiment 5.

FIG. 17 illustrates an example of the configuration of the information processing apparatus 10 according to this embodiment.

The information processing apparatus 10 according to this embodiment includes a relationship weight updating unit 70 in addition to the constituent elements included in the information processing apparatus 10 according to Embodiment 4.

The relationship weight updating unit 70 updates the relationship weights recorded in the relationship weight DB 94 based on whether the confusion factor corresponding to presentation information acquired by the presentation information control unit 40 is correct or incorrect.

Description of Operation

Figure 18:
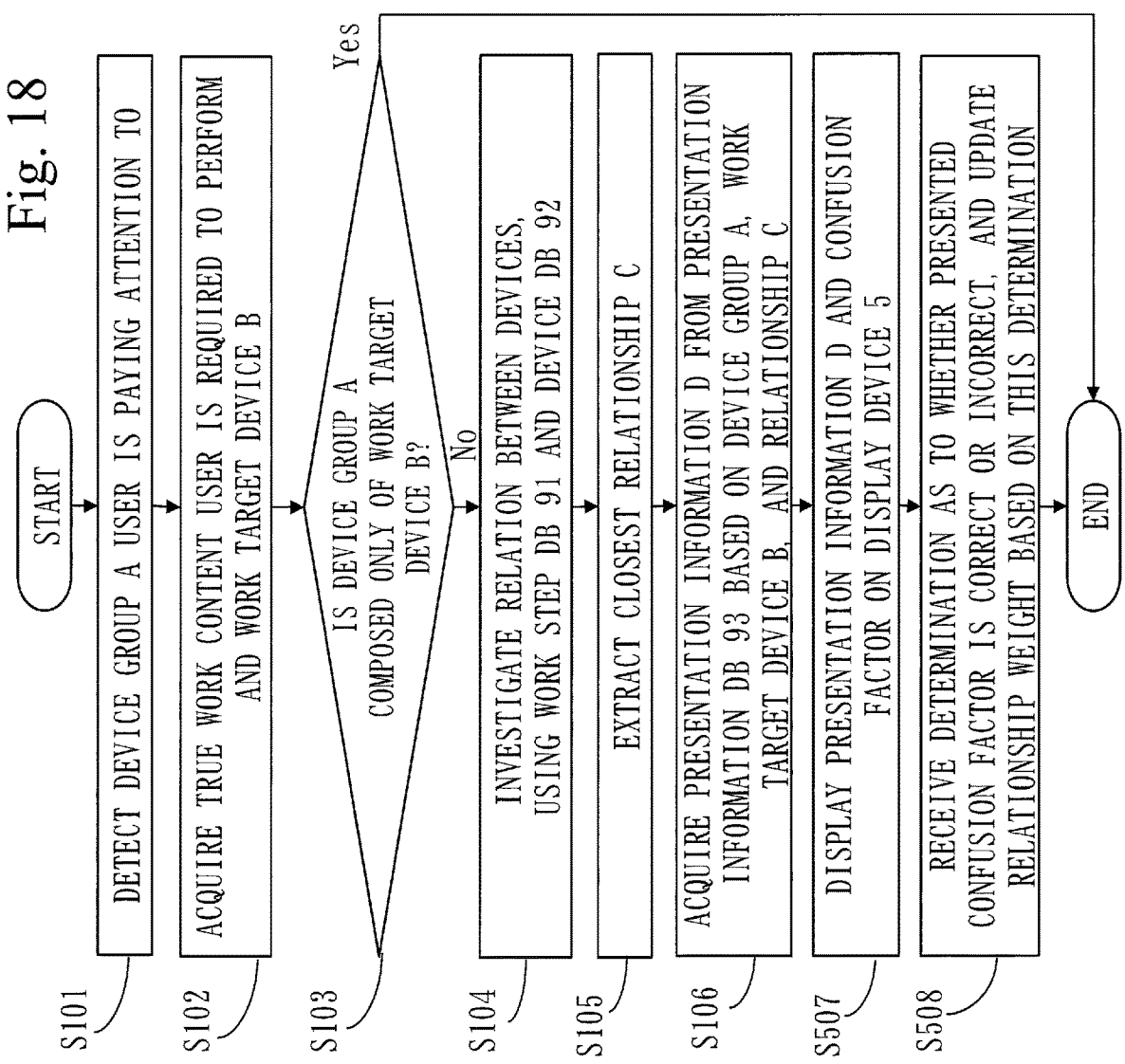
FIG. 18 is a flowchart illustrating operation of the information processing apparatus 10 according to Embodiment 5.

FIG. 18 is a flowchart illustrating an example of the operation of the information processing apparatus 10 according to this embodiment. Referring to FIG. 18, the operation of the information processing apparatus 10 will be described. Step S101 to step S106 are as described above.
(Step S507)

The presentation information control unit 40 displays, on the display device 5, the presentation information D acquired in step S106 and information indicating the confusion factor corresponding to the relationship C extracted in step S105.
(Step S508)

The user determines whether the confusion factor displayed on the display device 5 is correct or incorrect, and inputs the determined result to the input device 7.

The relationship weight updating unit 70 receives information indicating the result of determining whether the confusion factor displayed on the display device 5 is correct or incorrect, and updates the relationship weight recorded in the relationship weight DB 94 based on the received information. As a specific example, a case will be considered where the confusion factor estimation unit 30 has estimated that the user is confused about the relationship concerning <similarity in characteristics> regarding the device D1 and the device D2, which is an incorrect result. In this case, the relationship weight updating unit 70 updates the value of the weight parameter regarding the device D1 and the device D2 and associated with this relationship so that the value of the relationship score regarding the device D1 and the device D2 and corresponding to this relationship becomes smaller. In this example, the value of $W_{D1D2-c}$ indicated in FIG. 15 is updated to a smaller value.

FIG. 19 is a figure describing how the relationship weight updating unit 70 updates the relationship weights. As a specific example, the relationship weights as indicated in (a) are set at the initial stage. Then, when the relationship weight updating unit 70 updates the relationship weights, the relationship weights become as indicated in (b).

Description of Effects of Embodiment 5

As described above, according to this embodiment, the relationship weight updating unit 70 updates the relationship weights, so that more appropriate information can be presented to the user when the tendency of confusion that occurs during work changes due to increased experience of the user and so on.

Embodiment 6

Differences from the embodiments described above will be mainly described below with reference to the drawings.

Description of Configuration

The information processing apparatus 10 according to this embodiment is substantially the same as the information processing apparatus 10 according to Embodiment 5.

The presentation information control unit 40 according to this embodiment acquires pieces of presentation information from the presentation information DB 93 according to the values of relationship scores. The pieces of presentation information acquired by the presentation information control unit 40 are displayed on the display device 5 in descending order of the relationship scores respectively corresponding to the pieces of presentation information.

Description of Operation

Figure 20:
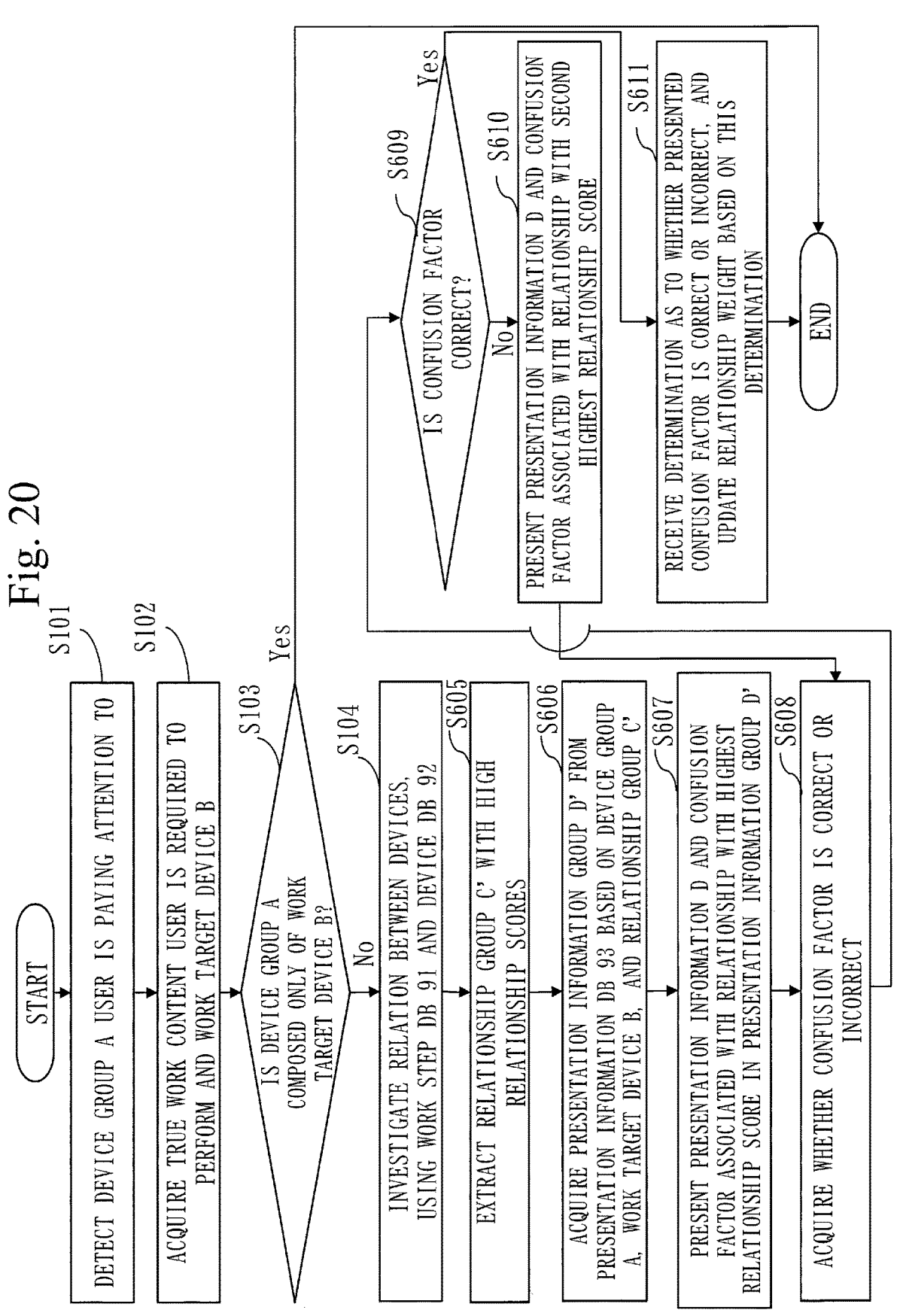
FIG. 20 is a flowchart illustrating operation of the information processing apparatus 10 according to Embodiment 6.

FIG. 20 is a flowchart illustrating an example of the operation of the information processing apparatus 10 according to this embodiment. Referring to FIG. 20, the operation of the information processing apparatus 10 will be described. Step S101 to step S104 are as described above.
(Step S605)
The presentation information control unit 40 extracts a relationship group C' composed of relationships with relatively high relationship score values. The presentation information control unit 40 may determine whether to include each relationship in the relationship group C' in any way.
(Step S606)
The presentation information control unit 40 acquires a presentation information group D' from the presentation information DB 93 based on the device group A, the work target device B, and the relationship group C'.
(Step S607)
First, the presentation information control unit 40 checks the relationship score value associated with each piece of presentation information included in the presentation information group D', and selects presentation information associated with the highest relationship score value among the checked relationship score values as presentation information D. At this time, the presentation information control unit 40 may sort pieces of presentation information included in the presentation information group D' according to the relationship score value associated with each piece of presentation information.

Next, the presentation information control unit 40 displays, on the display device 5, the presentation information D and information indicating the confusion factor corresponding to the relationship associated with the presentation information D.
(Step S608)
The user determines whether the confusion factor displayed on the display device 5 is correct or incorrect, and inputs the determined result to the input device 7.

The relationship weight updating unit 70 acquires information indicating that the confusion factor is correct or incorrect.

(Step S609)
In step S608, if the information acquired by the relationship weight updating unit 70 indicates that the confusion factor is correct, the information processing apparatus 10 proceeds to step S611. In other cases, the information processing apparatus 10 proceeds to step S610.
(Step S610)
This step is substantially the same as step S607. However, the presentation information control unit 40 selects the presentation information D from a presentation information group composed of each piece of presentation information that is included in the presentation information group D' and has not been selected as the presentation information D in the processing of this flowchart, instead of from the presentation information group D'. When selecting the presentation information D, the presentation information control unit 40 may utilize the results of checking the relationship scores in step S607.
(Step S611)
This step is substantially the same as step S508. However, there may be a case where the relationship weight updating unit 70 receives pieces of information each indicating a result of determining whether each of a plurality of confusion factors is correct or incorrect. In this case, the relationship weights recorded in the relationship weight DB 94 may be updated based on all the received pieces of information.

Description of Effects of Embodiment 6

As described above, according to this embodiment, the relationship weight updating unit 70 updates the relationship weights based on whether the confusion factors are correct or incorrect, so that the probability of being able to present appropriate information to the user is enhanced.

Other Embodiments

The above embodiments can be freely combined, or any constituent element of each of the embodiments can be modified. Alternatively, in each of the embodiments, any constituent element can be omitted.

The embodiments are not limited to those presented in Embodiments 1 to 6, and various modifications can be made as needed. The procedures described using the flowcharts or the like may be suitably modified.

REFERENCE SIGNS LIST

2: sensor, 3: line-of-sight sensor, 4: finger joint sensor, 5: display device, 7: input device, 10: information processing apparatus, 11: processor, 12: memory, 13: auxiliary storage device, 14: input/output IF, 15: communication device, 18: processing circuit, 19: signal line, 20: work target detection unit, 30: confusion factor estimation unit, 40: presentation information control unit, 50: user information acquisition unit, 60: relationship weight acquisition unit, 70: relationship weight updating unit, 91: work step DB, 92: device DB, 93: presentation information DB, 94: relationship weight DB.

The invention claimed is:
1. An information processing apparatus comprising processing circuitry to:
  detect an attention device group composed of at least one device that a user who is working is paying attention to;
  set each device, excluding a work target device, that is included in the attention device group as a target attention device, the work target device being a device corresponding to work that the user is required to perform, and calculate a relationship score that indicates a relationship between the target attention device and the work target device, and indicates a degree of confusion of the user in choosing between the target attention device and the work target device;

refer to a presentation information database that records presentation information so as to acquire presentation information based on the calculated relationship score; and display the presentation information on a display device to help the user to become aware of the work target device, to enable the user to choose the work target device based on the displayed presentation information and perform the work that the user is required to perform using the work target device.

2. The information processing apparatus according to claim 1, wherein the processing circuitry detects the attention device group based on an area that the user is looking at.

3. The information processing apparatus according to claim 1, wherein the processing circuitry detects the attention device group based on a position of a finger joint of the user.

4. The information processing apparatus according to claim 1, wherein the processing circuitry calculates the relationship score based on content of work that the user is required to perform.

5. The information processing apparatus according to claim 1, wherein the processing circuitry calculates the relationship score using a relationship weight defined between the work target device and each device, excluding the work target device, that is included in the attention device group.

6. The information processing apparatus according to claim 5, wherein the processing circuitry calculates the relationship score for each confusion factor that causes confusion for the user in choosing between the target attention device and the work target device, and wherein the processing circuitry updates the relationship weight based on whether a confusion factor corresponding to acquired presentation information is correct or incorrect.

7. The information processing apparatus according to claim 6, wherein the processing circuitry refers to the presentation information database to acquire pieces of presentation information according to values of the relationship scores, and wherein the acquired pieces of presentation information are displayed on the display device in descending order of the relationship scores respectively corresponding to the acquired pieces of presentation information.

8. An information processing method comprising:

detecting an attention device group composed of at least one device that a user who is working is paying attention to, by a computer;

setting each device, excluding a work target device, that is included in the attention device group as a target attention device, the work target device being a device corresponding to work that the user is required to perform, and calculating a relationship score that indicates a relationship between the target attention device and the work target device, and indicates a degree of confusion of the user in choosing between the target attention device and the work target device, by the computer;

referring to a presentation information database that records presentation information so as to acquire presentation information based on the calculated relationship score; and displaying the presentation information on a display device to help the user to become aware of the work target device, to enable the user to choose the work target device based on the displayed presentation information and perform the work that the user is required to perform using the work target device.

9. A non-transitory computer readable medium storing an information processing program that causes an information processing apparatus, which is a computer, to execute:

a work target detection process of detecting an attention device group composed of at least one device that a user who is working is paying attention to;

a confusion factor estimation process of setting each device, excluding a work target device, that is included in the attention device group as a target attention device, the work target device being a device corresponding to work that the user is required to perform, and calculating a relationship score that indicates a relationship between the target attention device and the work target device, and indicates a degree of confusion of the user in choosing between the target attention device and the work target device; and a presentation information control process of referring to a presentation information database that records presentation information so as to acquire presentation information based on the calculated relationship score, and displaying the presentation information on a display device to help the user to become aware of the work target device, to enable the user to choose the work target device based on the displayed presentation information and perform the work that the user is required to perform using the work target device.

* * * * *